(12) United States Patent
Reder

(10) Patent No.: US 9,694,648 B2
(45) Date of Patent: Jul. 4, 2017

(54) MOTOR VEHICLE WITH AIR DUCT SECTIONS FOR THE AIR CONDITIONING OF THE VEHICLE INTERIOR SPACE

(75) Inventor: Gerhard Reder, Moensheim (DE)

(73) Assignee: Dr. Ing, h.c.F. Porsche Aktiengesellschaft, Stuttgart (DE)

( * ) Notice: Subject to any disclaimer, the term of this patent is extended or adjusted under 35 U.S.C. 154(b) by 1025 days.

(21) Appl. No.: 12/410,819

(22) Filed: Mar. 25, 2009

(65) Prior Publication Data

US 2009/0291626 A1 Nov. 26, 2009

(30) Foreign Application Priority Data

May 20, 2008 (DE) .................. 10 2008 024 430

(51) Int. Cl.
*B60H 1/00* (2006.01)

(52) U.S. Cl.
CPC ....... *B60H 1/0055* (2013.01); *B60H 1/00564* (2013.01); *B60H 2001/00078* (2013.01)

(58) Field of Classification Search
CPC .............. B60H 1/0055; B60H 1/00564; B60H 1/00028; B60H 2001/00078; B64D 13/00; B64D 13/006
USPC ....... 454/144, 130, 136, 137, 135, 104, 105, 454/143; 296/208
See application file for complete search history.

(56) References Cited

U.S. PATENT DOCUMENTS

| | | | | |
|---|---|---|---|---|
| 2,268,502 A * | 12/1941 | Browne | ................. | B60H 1/247 454/105 |
| 4,432,213 A * | 2/1984 | Katahira | ............ | B60H 1/00207 296/208 |
| 4,711,159 A * | 12/1987 | Armbruster | .......... | B60H 3/0616 454/137 |
| 6,319,113 B1 * | 11/2001 | Allershausen | ..... | B60H 1/00564 296/208 |
| 6,457,767 B1 * | 10/2002 | Omarain | ................ | B60H 1/247 296/208 |
| 6,616,522 B2 * | 9/2003 | Colinet | .............. | B60H 1/00207 454/121 |
| 6,857,681 B2 * | 2/2005 | Nakajima | .......... | B60H 1/00564 216/21 |
| 7,247,088 B2 * | 7/2007 | Sogame | ............. | B60H 1/00407 454/124 |

(Continued)

FOREIGN PATENT DOCUMENTS

DE 10208358 A1 9/2003
DE 10 2005 054 961 A1 5/2007

(Continued)

OTHER PUBLICATIONS

Translation of EP1522437.*

*Primary Examiner* — Alissa Tompkins
*Assistant Examiner* — Frances F Hamilton
(74) *Attorney, Agent, or Firm* — Gerald E. Hespos; Michael J. Porco; Matthew T. Hespos

(57) ABSTRACT

A motor vehicle has lower and upper air duct sections (4, 8) arranged within the motor vehicle in series in a throughflow direction, with a vent for conveying and discharging air for air conditioning the vehicle interior space. The lower air duct section (4) is arranged in the region of an inner floor of the vehicle and is fixed to the bodyshell. The upper air duct section (8) is part of a lining (9) for the B pillar (2).

8 Claims, 3 Drawing Sheets

(56) References Cited

U.S. PATENT DOCUMENTS

| | | | | |
|---|---|---|---|---|
| 7,621,556 B2 * | 11/2009 | Itakura | ................. | B60R 21/213 280/728.2 |
| 8,128,161 B2 * | 3/2012 | Yang | ................. | B60H 1/00564 296/208 |
| 8,449,359 B2 * | 5/2013 | Tani | ................. | B60H 1/00514 454/121 |
| 8,459,727 B2 * | 6/2013 | Mayr | ..................... | B62D 25/24 296/190.09 |
| 2007/0123157 A1 * | 5/2007 | Shah | .................. | B60H 1/0055 454/121 |
| 2008/0233856 A1 * | 9/2008 | Okawa | .............. | B60H 1/00564 454/143 |
| 2008/0293348 A1 * | 11/2008 | Schweitzer | ........ | B60H 1/00564 454/69 |
| 2015/0140917 A9 * | 5/2015 | Bruss | ................ | B60H 1/00378 454/143 |

FOREIGN PATENT DOCUMENTS

| | | | | |
|---|---|---|---|---|
| EP | 1 522 437 | | 4/2005 | |
| EP | 1 522 437 A1 | | 4/2005 | |
| FR | EP 1306247 A1 * | | 5/2003 | ......... B60H 1/00564 |
| JP | 2002103946 A | * | 4/2002 | |
| JP | 2003285622 A | * | 10/2003 | |
| KR | 2006039636 A | * | 5/2006 | |

\* cited by examiner

MOTOR VEHICLE WITH AIR DUCT SECTIONS FOR THE AIR CONDITIONING OF THE VEHICLE INTERIOR SPACE

CROSS-REFERENCE TO RELATED APPLICATIONS

This application claims priority under 35 USC 119 to German Patent Application No. 10 2008 024430.9 filed on May 20, 2008, the entire disclosure of which is incorporated herein by reference.

BACKGROUND OF THE INVENTION

1. Field of the Invention

The invention relates to a motor vehicle having air duct sections arranged in the motor vehicle and arranged in series in a throughflow direction. A vent for conveys and discharges air for air conditioning the vehicle interior space.

2. Description of the Related Art

EP 1 522 437 A1 discloses a vehicle with an air supply device arranged in a region of a roof lining of the motor vehicle, such as a utility vehicle.

It is an object of the invention to provide a structurally simple easy to assemble arrangement of air duct sections in the region of a B pillar of the motor vehicle.

SUMMARY OF THE INVENTION

The invention relates to a motor vehicle that has a lower and upper air duct sections. The lower air duct section is arranged in the region of an inner floor of the vehicle and is fixed to the bodyshell. The upper air duct section is at the B pillar of the vehicle and is a part of a lining for the B pillar of the vehicle.

Therefore, the air duct of the motor vehicle is divided in the region of the B pillar. The division permits a particularly simple assembly of the air duct sections and of the lining of the B pillar, because the lining for the B pillar is part of the upper air duct section.

The lower air duct section preferably extends into a region of the bodyshell of the B pillar above the level of a door sill strip of the driver-side or passenger-side door of the vehicle. The lower air duct section is formed to be fixed to the bodyshell up to a point above the division between the B pillar lining and the door sill strip, and preferably up to a point a short distance above the division. The remainder of the duct up to the vent is defined by the upper air duct section and forms a part of the B pillar lining. Thus, a leakage-free connection of the air duct sections is obtained in a simple manner.

The vent may be formed as a separate component that is connected to the free end of the upper air duct section, and may be plugged onto the upper air duct section.

The assembly of the B pillar lining preferably takes place so that the lining initially is plugged under a molded roof lining of the vehicle and subsequently is pivoted down onto the bodyshell and connected there, in particular by a clip connection. A receptacle for plugging in the lining preferably is formed at a transition region to the molded roof lining for pivotably holding the lining in the region of the molded roof lining. A component preferably is fixed to the bodyshell of the B pillar for pivotably holding the lining in the region of the upper end of the bodyshell.

A region near the lower end of the lining preferably is connected to the bodyshell. The connection preferably takes place in the region of the bodyshell of the B pillar or to the adjoining lower inner lining. A region near the lower end of the lining also may be connected to the bodyshell of the vehicle in the region of the vehicle base or to the lower air duct section.

A region of the lower air duct section near the end that faces toward the upper air duct section preferably is aligned up and is arranged within a lower region of the upper air duct section to provide a particularly simple overlapped structural connection of the air duct sections. Thus, the upper air duct section can be mounted in an extremely simple manner by pivoting so that the lower end region of the upper air duct engages around the lower air duct. Leakage-free division of the air duct by means of the two air duct sections is ensured in this way.

One preferred exemplary embodiment of the invention is explained on the basis of the following drawing and the description thereof.

DETAILED DESCRIPTION OF THE PREFERRED EMBODIMENT

Figure 1:
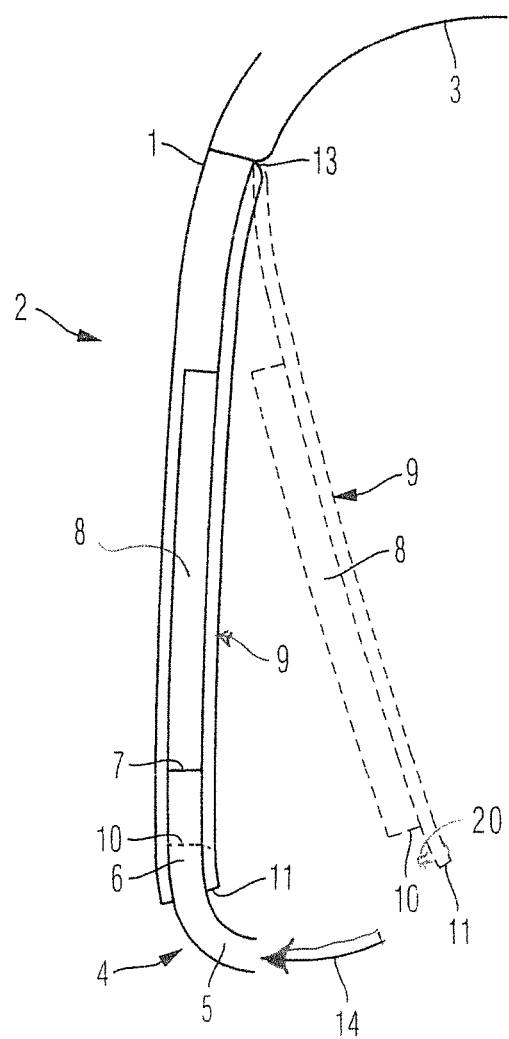
FIG. 1 is a schematic illustration of a passenger motor vehicle, in the region of the B pillar, with the lining shown in different positions to show the assembly of the upper air duct section.
Figure 3:
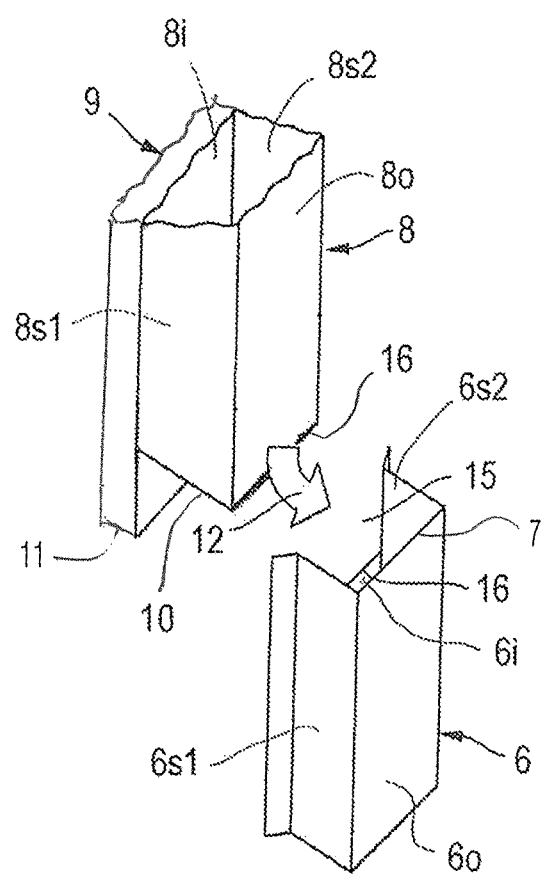
FIG. 3 is a three-dimensional view of the end regions of the two air duct sections.

A passenger motor vehicle in accordance with the invention has a B pillar denoted generally by the numeral 2 in FIG. 1. The B pillar 2 has a bodyshell 1. The passenger motor vehicle also has a molded roof lining denoted by the reference numeral 3. The vehicle also has an air duct section 4 with an end that is connected fixedly to the bodyshell 1 of the B pillar 2, as shown in FIG. 1. More particularly, the air duct section 4 has a horizontal region that is mounted in the base, a curved region 5 that adjoins the horizontal region, and a straight, substantially vertical region 6 that adjoins the upper end of the curved region 5. The straight region 6 of the lower air duct section 4 has a rectangular cross section with an inner panel 6i, an outer panel 6o and side panels 6s1, 6s2, as shown in FIG. 3. The straight region 6 of the lower air duct section 4 is formed with an upper end 7, as defined by upper ends of the outer panel 6o and the side panels 6s1, 6s2. However, the straight region 6 of the lower air duct section 4 has a cutout 15 so that the upper end 16 of the inner panel 8i is lower than the upper end 7 of the lower air duct section 4, as defined by the outer panel 6o and the side panels 6s1, 6s2. The straight region 6 may be connected fixedly to the bodyshell 1 of the B pillar 2.

The vehicle also has an upper air duct section 8 that is arranged in the bodyshell 1 of the B pillar 2. A pillar lining 9 is attached to the upper air duct section 8 and faces into the vehicle interior space. The pillar lining 9 is shown in FIG. 1 by solid lines in its assembled position and by dashed lines in an intermediate assembly position. The upper air duct section 8 has a lower end 10 that extends to a point below the level of the upper end 7 of the lower air duct section 4. The lining 9 has a lower end 11 closer to the base of the vehicle than the lower end 10 of the upper air duct section 8, and is therefore arranged at a lower level than the lower end 10 of the upper air duct section 8. FIG. 3 shows the design of the lower end 10 of the upper air duct section 8 in the intermediate assembly position, with the assembly direction being indicated by the arrow 12.

The upper air duct section 8 is mounted in the region of the bodyshell 1 of the B pillar 2 by inserting the upper end of the pillar lining 9 into a receptacle 13 in the transition region to a molded roof lining 3 adjacent to the B pillar 2. The lower part of the upper air duct section 8 initially is spaced from the B pillar 2 in the intermediate position illustrated by dashed lines in FIG. 1. The lower part of the upper air duct section 8 then is pivoted in the direction of the arrow 14 onto the bodyshell 1 of the lower part of the B pillar 2 and into the assembled position shown by solid lines in FIG. 1. The pillar lining 9 is clipped to the bodyshell 1 in the assembled position by clip connectors 20. Thus, the top end of upper air duct section 8 is held securely by the engagement of the upper end of the pillar lining 9 in the receptacle 13 adjacent the molded roof lining 3 and the lower end of the upper air duct section 8 is held securely by the clip connection to the bodyshell 1.

The upper air duct section 8 has a rectangular cross section that substantially matches the rectangular cross section of the lower air duct section 4 in size and shape, as shown in FIG. 3. The regions of the upper air duct section 8 near the lower end have an inner panel 8*i*, an outer panel 8*o* and side panels 8*s*1, 8*s*2. Thus, regions of the lower end 10 of the upper air duct section 8 overlap with regions of the upper end 7 of the lower air duct section 4 when the lower end 10 of the upper air duct section 8 is pushed laterally toward the B pillar 2. This overlap is obtained by means of the cutout 15 at the upper end of the inner panel 6*i* of the lower air duct section 4 so that, when the lower and upper air duct sections 4 and 8 are assembled, the lower edges 16 of the upper air duct section 8 are arranged at approximately the same level as the upper end 16 of the inner panel 6*i* of the lower air duct section 4, with the lower end 10 of the upper air duct section 8 being aligned with areas of the side panels 6*s*1, 6*s*2 and the outer panel 6*o* above the inner panel 6*i* of the lower air duct section 4, as shown in FIG. 3.

Figure 2:
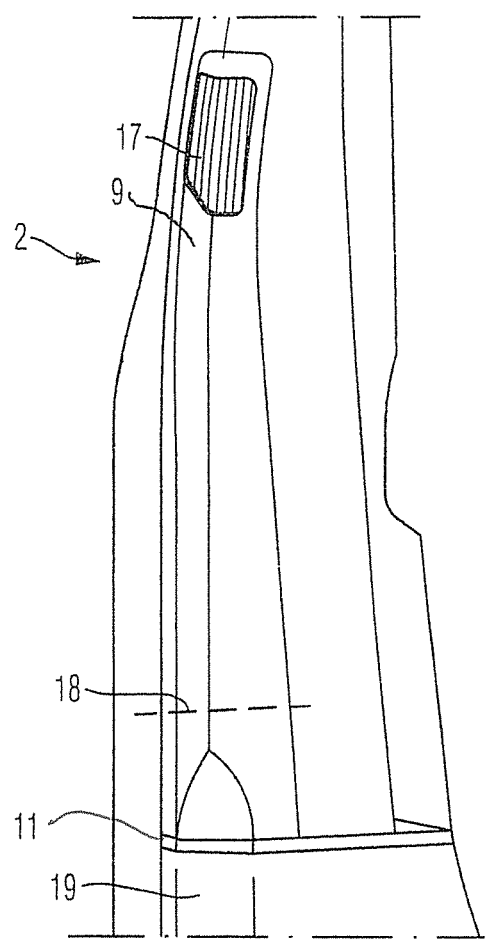
FIG. 2 is an elevational view of a region of the B pillar of the motor vehicle as viewed from the vehicle interior space.

FIG. 2 shows the pillar lining 9 with a vent 17 being plugged onto the upper end of the upper air duct section 8. The dashed line 18 in FIG. 2 shows the level of the lower parting point between the two air duct sections 4 and 8, as defined by the lower end 10 of the upper air duct section 8. The pillar lining 9 therefore extends down a considerable distance below the level 18 to a lower lining 19 that covers the lower region of the bodyshell 1 of the B pillar 2 and the adjacent door sill region of the vehicle. The level 18 shows that the lower air duct section 4 extends into a region of the bodyshell 1 of the B pillar 2 above the level of the horizontal sill strip of a driver-side or passenger-side door of the vehicle that delimits the door opening at the bottom.

What is claimed is:

1. A motor vehicle comprising:
    a floor;
    a roof having a molded roof lining with a receptacle formed therein,
    a B pillar extending between the floor and the roof, the B pillar having a bodyshell with an open side facing inwardly on the vehicle;
    a lower air duct section extending partly in the floor of the vehicle and having an upper end portion extending partly into a lower part of the bodyshell of the B pillar, the upper end portion of the lower air duct section having an inner panel on a side of the lower air duct section facing into the vehicle, an outer panel opposite the inner panel and opposite side panels extending between the inner and outer panels, the inner panel, the outer panel and the side panels having upper edges, the upper edge of the inner panel being offset to a lower position than the upper edges of the outer panel and the side panels to define a cutout adjacent a top edge of the inner panel of the lower air duct section and between the side panels thereof,
    an upper air duct section arranged in the bodyshell of the B pillar and having an inner panel on a side toward the interior of the vehicle, an outer panel opposite the inner panel and opposite side panels extending between the inner and outer panels of the upper air duct section, the panels of the upper air duct section having lower edges that are lower than upper edges of the outer panel and the side panels of the lower air duct section and are at substantially the same height as the upper end of the inner panel of the lower air duct section so that the lower end of the upper air duct section is nested into the cutout at the upper end of the lower air duct section,
    a pillar lining connected to a side of the inner panel of the upper air duct section facing inwardly on the vehicle and covering the open side of the B pillar facing inwardly on the vehicle, the pillar lining having an upper end pivotally mounted in the receptacle of the roof lining and a lower end below the lower end of the upper air duct section, and the upper end of the pillar lining being above an upper end of the upper air duct section.

2. The motor vehicle of claim 1, further comprising a vent at an end of the upper air duct section facing away from the lower air duct section.

3. The motor vehicle of claim 1, wherein the lower end of the pillar lining is connected to the bodyshell or to the lower air duct section.

4. The motor vehicle of claim 3, further comprising a clip connection connecting the pillar lining to the bodyshell.

5. The motor vehicle of claim 1, wherein the upper and lower air duct sections are connected sealingly to one another.

6. The motor vehicle of claim 1, further comprising a vent extending through a portion of the pillar lining between the upper end of the pillar lining and the upper end of the upper air duct section, the vent communicating with the upper end of the upper air duct section.

7. The motor vehicle of claim 1, wherein the lower end of the pillar lining is connected to the bodyshell of the B pillar.

8. The motor vehicle of claim 1, further comprising a door opening and a sill strip at lower part of the door opening, the lower air duct section extending into the bodyshell of the B pillar to a position higher than the sill strip.

* * * * *